United States Patent
Hur et al.

(10) Patent No.: US 10,663,007 B2
(45) Date of Patent: May 26, 2020

(54) INJECTION APPARATUS FOR MOLDING COMBINED MEMBER OF CONSTANT-VELOCITY JOINT BOOT, INJECTION METHOD OF COMBINED MEMBER OF CONSTANT-VELOCITY JOINT BOOT, AND CONSTANT-VELOCITY JOINT BOOT MANUFACTURED BY INJECTION METHOD OF COMBINED MEMBER

(71) Applicants: Yong-Hoon Hur, Daegu (KR); Young-Chun Kim, Daegu (KR)

(72) Inventors: Yong-Hoon Hur, Daegu (KR); Young-Chun Kim, Daegu (KR)

(*) Notice: Subject to any disclaimer, the term of this patent is extended or adjusted under 35 U.S.C. 154(b) by 536 days.

(21) Appl. No.: 15/389,595

(22) Filed: Dec. 23, 2016

(65) Prior Publication Data

US 2018/0133941 A1    May 17, 2018

(30) Foreign Application Priority Data

Nov. 16, 2016   (KR) .................. 10-2016-0152803

(51) Int. Cl.
| | | |
|---|---|---|
| *B29C 45/14* | (2006.01) | |
| *F16D 3/84* | (2006.01) | |
| *B29C 45/77* | (2006.01) | |
| *B29C 45/42* | (2006.01) | |
| *B29C 45/40* | (2006.01) | |
| *B29C 45/04* | (2006.01) | |
| *B29C 45/26* | (2006.01) | |
| *B29C 45/27* | (2006.01) | |

(Continued)

(52) U.S. Cl.
CPC .............. *F16D 3/845* (2013.01); *B29C 33/48* (2013.01); *B29C 45/261* (2013.01); *B29C 45/2612* (2013.01); *B29C 45/2756* (2013.01); *B29C 45/44* (2013.01); *B29C 2045/2779* (2013.01); *B29L 2031/30* (2013.01); *F16D 2003/22316* (2013.01)

(58) Field of Classification Search
CPC ....... B29C 45/14; B29C 33/48; B29C 45/261; B29C 45/2612; B29C 45/2756; F16D 3/845
USPC .................................................. 425/DIG. 58
See application file for complete search history.

(56) References Cited

U.S. PATENT DOCUMENTS

| | | | | |
|---|---|---|---|---|
| 3,843,088 | A * | 10/1974 | McLoughlin ........... | B29C 45/33 249/144 |
| 3,905,740 | A * | 9/1975 | Lovejoy .................. | B29C 45/33 425/438 |

(Continued)

FOREIGN PATENT DOCUMENTS

| | | |
|---|---|---|
| JP | 3657944 B1 | 6/2005 |
| KR | 10-1405187 B1 | 6/2014 |

*Primary Examiner* — Xiao S Zhao
*Assistant Examiner* — Emmanuel S Luk
(74) *Attorney, Agent, or Firm* — Im IP Law; Chai Im; C. Andrew Im

(57) ABSTRACT

An injection apparatus to mold a combined member with excellent performance to a constant-velocity joint boot to seal constant-velocity universal joints. The constant-velocity universal joints are used for smooth operation of a drive shaft which transfers driving power from a differential gear of a vehicle to a hub on which a tire is mounted. An injection method of the combined member of the constant-velocity joint boot. A constant-velocity joint boot manufactured by the injection method of the combined member.

4 Claims, 10 Drawing Sheets

(51) Int. Cl.
   *B29C 33/48* (2006.01)
   *B29C 45/44* (2006.01)
   *B29L 31/30* (2006.01)
   *F16D 3/223* (2011.01)

(56) References Cited

U.S. PATENT DOCUMENTS

| | | | | |
|---|---|---|---|---|
| 4,209,160 A * | 6/1980 | Vanotti | ............... | B29C 37/0014 249/162 |
| 4,375,948 A * | 3/1983 | von Holdt | ............... | B29C 45/43 425/437 |
| 4,524,943 A * | 6/1985 | Busch | ..................... | B29C 45/33 249/63 |
| 5,156,309 A * | 10/1992 | Friedrich | ........... | B65D 83/0061 222/135 |
| 5,700,415 A * | 12/1997 | Hiroki | ................... | B29C 33/485 249/152 |
| 5,851,476 A * | 12/1998 | Wydra | ..................... | B29C 49/00 264/507 |
| 7,488,259 B2 * | 2/2009 | Sueoka | ............. | B29C 45/14336 464/175 |
| 7,588,713 B2 * | 9/2009 | Sueoka | ............. | B29C 45/14336 264/255 |
| 8,071,005 B2 * | 12/2011 | Magistrale | ............. | B29C 45/02 264/271.1 |
| 9,573,305 B2 * | 2/2017 | Yuan | ..................... | B29C 45/435 |
| 2002/0098260 A1 * | 7/2002 | Joung | ................. | B29C 45/2681 425/556 |
| 2002/0122841 A1 * | 9/2002 | Joseph | ................... | B29C 45/332 425/556 |
| 2004/0145084 A1 * | 7/2004 | Chapplear | ............... | B29C 45/44 264/328.1 |
| 2004/0159976 A1 | 8/2004 | Sueoka et al. | | |
| 2005/0046077 A1 * | 3/2005 | Sueoka | ............ | B29C 45/14336 264/259 |
| 2005/0046078 A1 * | 3/2005 | Sueoka | ............ | B29C 45/14336 264/267 |
| 2006/0068925 A1 * | 3/2006 | Sueoka | ............ | B29C 45/14336 464/175 |
| 2007/0141196 A1 * | 6/2007 | Ciccone | ............ | B29C 45/2628 425/577 |
| 2009/0209353 A1 * | 8/2009 | Abels | ................. | B29C 45/2612 464/106 |
| 2011/0316195 A1 * | 12/2011 | Seo | ....................... | B29C 45/435 264/328.1 |
| 2012/0153540 A1 * | 6/2012 | Kurimoto | ............... | B29C 45/33 264/328.1 |
| 2014/0217650 A1 * | 8/2014 | Weckerle | ................ | B29C 49/06 264/537 |
| 2015/0360405 A1 * | 12/2015 | Ueno | ...................... | F16J 15/52 264/318 |
| 2019/0217515 A1 * | 7/2019 | Renzo | ................... | B29C 45/262 |

\* cited by examiner

INJECTION APPARATUS FOR MOLDING COMBINED MEMBER OF CONSTANT-VELOCITY JOINT BOOT, INJECTION METHOD OF COMBINED MEMBER OF CONSTANT-VELOCITY JOINT BOOT, AND CONSTANT-VELOCITY JOINT BOOT MANUFACTURED BY INJECTION METHOD OF COMBINED MEMBER

CROSS-REFERENCE TO RELATED APPLICATION

The present application claims the benefit of priority from Korean Patent Application No. 10-2016-0152803 filed in the Korean Intellectual Property Office on Nov. 16, 2016, the entire contents of which are incorporated herein by reference.

FIELD OF THE INVENTION

The present invention relates to an injection apparatus for molding a combined member of a constant-velocity joint boot, an injection method of the combined member of the constant-velocity joint boot, and a constant-velocity joint boot manufactured by the injection method of the combined member, and more particularly, to an injection apparatus for molding a combined member with excellent performance to a constant-velocity joint boot to seal constant-velocity universal joints used for smooth operation of a drive shaft which transfers driving power from a differential gear of a vehicle to a hub on which a tire is mounted, an injection method of the combined member of the constant-velocity joint boot, and a constant-velocity joint boot manufactured by the injection method of the combined member.

BACKGROUND OF THE INVENTION

Constant-velocity universal joints are mounted at both end portions of a drive shaft which receives driving power from a differential gear of a vehicle. In this instance, the constant-velocity joints are means to equally transfer driving power of the differential gear even though the drive shaft does not keep a straight line. The constant joint serves to offset a change of velocity according to a refraction angle of the drive shaft using universal joint means with a great bending angle. A constant-velocity joint boot is combined to a driving part of the constant-velocity joint so that the driving part is sealed.

FIG. 1 is a perspective view showing an example that a boot 1 is applied to a constant-velocity joint (J). As shown in FIG. 1, a large-diameter tube body 2 of the boot 1 is combined to a driving part of the constant-velocity joint (J) so that a clamping band B1 pressurizes the outer peripheral surface of the large-diameter tube body 2 to maintain the combined state. A drive shaft (S) is combined to a small-diameter tube body 3 which is connected with the large-diameter tube body 2 through a bellows connection tube 4 so that a clamping band B2 pressurizes the outer peripheral surface of the small-diameter tube body 3 to maintain the combined state. Grease which provides a lubrication action is inserted into the constant-velocity joint boot 1 in order to improve driving performance of the driving part and to prevent invasion of foreign matters, such as dust or water, into the driving part of the constant-velocity joint (J) by the constant-velocity joint boot 1.

In the meantime, for the constant-velocity joints, there are rzeppa universal joints or bell type joints that a ball for transferring driving power is inserted into a ball retainer and a housing formed at one axis is combined with the ball retainer, and tripod joints that three pairs of rollers mounted inside a housing slidably move in an axial direction. A plurality of grooves which are formed in the axial direction are formed on the outer surface of the housing of the constant-velocity joint so as to make the constant-velocity joint lightweight, reduce required materials and enhance combining performance with the boot.

As shown in FIGS. 2 to 4, the constant-velocity joint boot 1 which are applicable to the rzeppa universal joints, the bell type joints or the tripod joints includes: a large-diameter tube body 2 combined with a housing of the constant-velocity joint; a small-diameter tube body 3 which accommodates the outer diameters of the large-diameter tube body 2 and the drive shaft; and a bellows connection tube 4 which connects the large-diameter tube body 2 and the small-diameter tube body 3 with each other, and the large-diameter tube body 2, the small-diameter tube body 3 and the bellows connection tube 4 are molded integrally. A combined member 5, which includes a thick protrusion part 5b combined to the groove formed in the housing of the constant-velocity joint and a thin protrusion part 5a accommodating the outer diameter of the housing of the constant-velocity joint, is mounted inside the large-diameter tube body 2.

The boot 1 in which the large-diameter tube body 2, the small-diameter tube body 3 and the bellows connection tube 4 for connecting the large-diameter tube body 2 and the small-diameter tube body 3 with each other are formed integrally is molded, and then, the combined member 5 which has the thick protrusion part 5b combined to the groove of the housing of the constant-velocity joint and the thin protrusion part 5a accommodating the outer diameter of the housing of the constant-velocity joint are combined is molded. After that, the combined member 5 is forcedly fit and adhered to the inside of the large-diameter tube body 2 of the boot 1 to be combined with the boot 1.

In such a case that the boot 1 and the combined member 5 are molded separately and assembled with each other, it deteriorates productivity because the number of processes is increased and it takes much time. Moreover, if the processes are not carried out accurately, because the boot 1 is not closely combined with the combined member 5, it may causes oil leakage during use.

Therefore, various methods and apparatuses for manufacturing a boot with excellent performance, which are reduced in the number of processes and process period of time, through a first molding step of integrally molding the large-diameter tube body 2, the small-diameter tube body 3 and the bellows body 4 for connecting the large-diameter tube body 2 and the small-diameter tube body 3 with each other and a second molding step of molding the combined member 5 inside the large-diameter tube body 2 of the first molded body in a double injection manner have been proposed and attempted.

CITED REFERENCES

Patent Documents

Patent Reference 1: Japanese Patent No. 03657944 (Jun. 8, 2005)
Patent Reference 1: Korean Patent No. 10-1405187 (Jun. 10, 2014)

SUMMARY OF THE INVENTION

Accordingly, the present invention has been made to solve the above-mentioned problems occurring in the prior arts, and it is an object of the present invention to provide a method for manufacturing a constant-velocity joint boot through a double injection method that a melt resin material is injected to the inside of a large-diameter tube body of a first molded boot so that a wanted type combined member is molded. In detail, the method for manufacturing the constant-velocity joint boot which carries out second injection molding of the combined member inside the large-diameter tube body of the boot first molded includes the steps of: putting a large-diameter tube body of the first molded boot in a second injection molding mold; locating a core mold inside the large-diameter tube body to prepare a molding cavity for molding a combined member between the inner peripheral surface of the large-diameter tube body and the core mold; locating an injection gate below the large-diameter tube body and upwardly injecting a melt resin material through the injection gate; and cooling the injected melt resin material and separating it from the core mold.

When the combined member is injection-molded as described above, a parting line (G) is formed between the inner surface of the large-diameter tube body of the first molded boot and the top of the injection-molded combined member according to a design form of the core mold (See FIG. 4).

The conventional method for manufacturing a boot using the double injection method has several disadvantages in that it is difficult to control injection pressure because the combined member is molded through upward injection of the melt resin material, in that the melt resin materials may flow over the parting line where the inner peripheral surface of the large-diameter tube body and the outer peripheral surface of the molding part of the core mold adjoining each other during the injection process of the melt resin material, and in that burrs of various sizes may be formed around the parting line if the melt resin material flows over the parting line formed between the inner surface of the large-diameter tube body and the combined member during the double injection process.

If the burrs formed over the parting line between the inner surface of the large-diameter tube body of the boot and the combined member are big, mutual interference between components of the constant-velocity joint and the burrs may occur during refraction of the drive shaft of the constant-velocity joint so as to deteriorate operation performance of the constant-velocity joint. Furthermore, the burrs are separated due to a continuous interference between the components of the constant-velocity joint and the burrs, and it causes a damage of the components when the separated burrs are fit to the driving system components of the constant-velocity joint. Additionally, if the separated burrs are fit to the driving system components of the constant-velocity joint while a vehicle runs at high speed, a fatal accident may happen due to impossibility of steering by stop of driving of the driving system components of the constant-velocity joint and the drive shaft.

As described above, the present invention has been made to solve the above-mentioned problems occurring in the prior arts, and it is an object of the present invention to provide an injection apparatus for molding a combined member of a constant-velocity joint boot, an injection method of the combined member of the constant-velocity joint boot, and a constant-velocity joint boot manufactured by the injection method of the combined member, which can injection-mold a combined member in such a way as to inject a melt resin material downwardly through a plurality of injection gates located at an upper area, which comes the closest to a parting line formed between the outer peripheral surface of a molding part of a core mold and the inner peripheral surface of a large-diameter tube body, according to a design form of the core mold in the state where a support mold is arranged such that the large-diameter tube body of the first molded boot faces downward and a molding cavity for injection-molding the combined member is prepared between the inner peripheral surface of the large-diameter tube body and the core mold, thereby minimizing generation of burrs around the parting line due to overflow of the melt resin material during the injection-molding process.

It is another object of the present invention to provide a double injection apparatus of a constant-velocity joint boot with excellent performance which adopts a method that the melt resin material supplied through injection bushing to approach from an upper part, namely, a small-diameter tube body, of the boot to the core mold is injected into a molding cavity via runners and injection gates formed in the core mold, thereby being capable of simply and easily installing a purging device for purging the boot perfectly injection-molded relative to the combined member.

To accomplish the above object, according to the present invention, there is provided an injection apparatus of a combined member of a constant-velocity joint boot including: a base mold which includes at least one elevation cylinder and a purging block mounted on a rod of the elevation cylinder to be elevated by operation of the elevation cylinder; a core mold which includes a molding part upwardly protruding through an inner area of the purging block of the base mold, a sprue mounted at a central point of a flat upper surface to allow a melt resin material to be supplied, a plurality of runners radially mounted around the sprue to extend to the molding part, and injection gates mounted at end portions of the runners to form an injection structure for the melt resin material, wherein the runners is downwardly inclined in the direction of the injection gates and the injection gates are located at an upper area adjacent to a parting line interposed between the outer peripheral surface of the molding part of the core mold and an inner peripheral surface of the large-diameter tube body of the boot; a support mold which includes a pair of slide molds moving forward and backward in a horizontal direction by a hydraulic cylinder or other driving means so as to engage with each other or be separated from each other, and support grooves respectively formed inside the slide molds to grasp the outer peripheral surface of a lower end portion of a bellows connection tube and the outer peripheral surface of a large-diameter tube body; a sealing cover which is mounted at the central portion and has a cover hole upwardly dented so as to accommodate the small-diameter tube body and the bellows connection tube which are disposed at the upper part; and an injection mold which is mounted above the support mold, vertically ascends and descends by the hydraulic cylinder or other driving means to come into contact with the support mold or to be separated from the support mold, the injection mold having an injection bushing which vertically crosses the central portion of the cover hole of the sealing cover so as to supply the melt resin material through an injection hole of the injection bushing.

According to the present invention, the injection gates are located at the area which is the closest to the parting line formed at the top of the combined member injection-molded on the inner surface of the large-diameter tube body of the first molded boot, and are mounted to be spaced apart from each other at uniform intervals. The melt resin material is injected in such a way as to naturally drop down through the injection gates so that the melt resin material gradually fills the molding cavity from the bottom for forming the combined member. Therefore, because the melt resin material injected into the molding cavity to be injected downwardly in uniform injection balance, the combined member can be injection-molded to prevent that the melt resin material flows over the parting line formed between the inner surface of the large-diameter tube body of the boot and the combined member.

The present invention fundamentally prevents that burrs are formed due to overflow of the melt resin material during the injection-molding process of the combined member, thereby preventing deterioration in performance of the constant-velocity joint mounted on the finished boot and preventing a fatal accident due to stop of operation and impossibility of steering because the burrs separated from the combined member molded on the boot are fit to the driving system components of the constant-velocity joint.

Additionally, the injection apparatus which has the purging device with the simple and easy structure for accurately and rapidly purging the finished boot can prevent damage of the injection-molded combined member while purging the boot after rapidly and effectively injection-molding the combined member.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
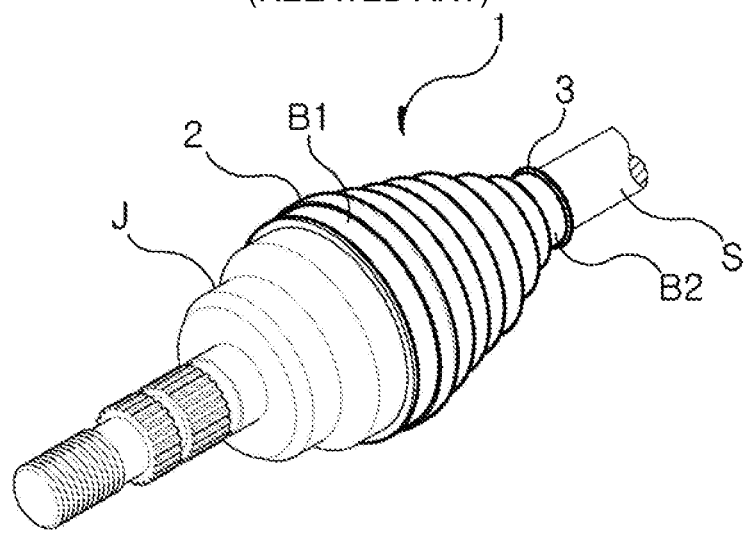
FIG. 1 is a perspective view showing an example that a boot is combined to a constant-velocity joint.
Figure 2:
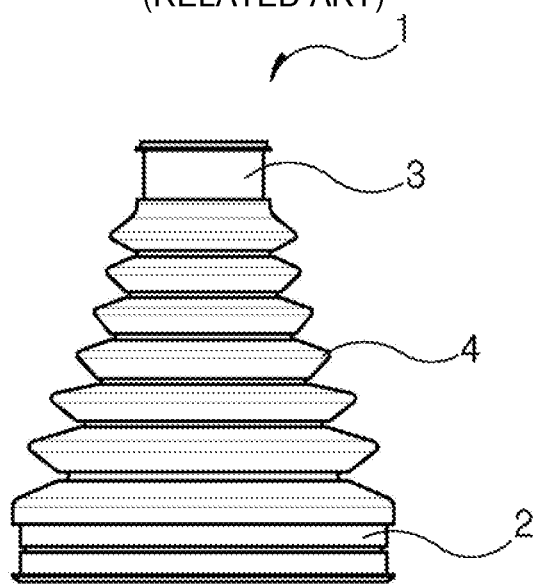
FIG. 2 is a front view showing a conventional constant-velocity joint boot.
Figure 3:
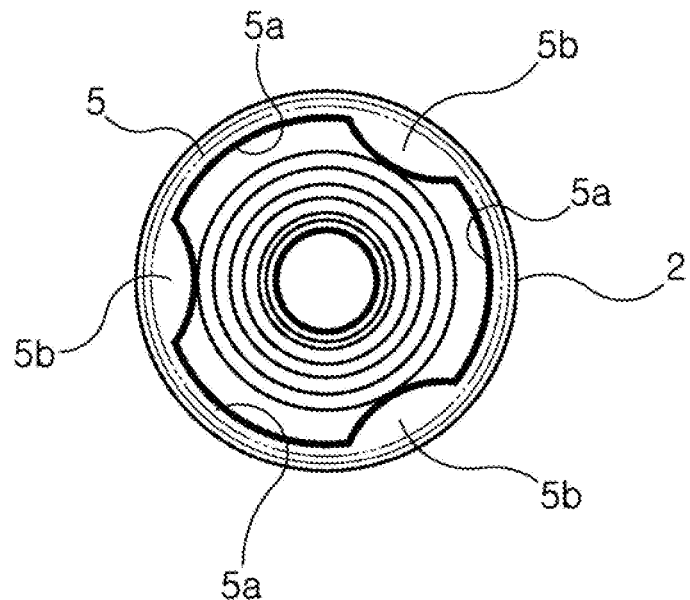
FIG. 3 is a bottom view of the constant-velocity joint boot.
Figure 4:
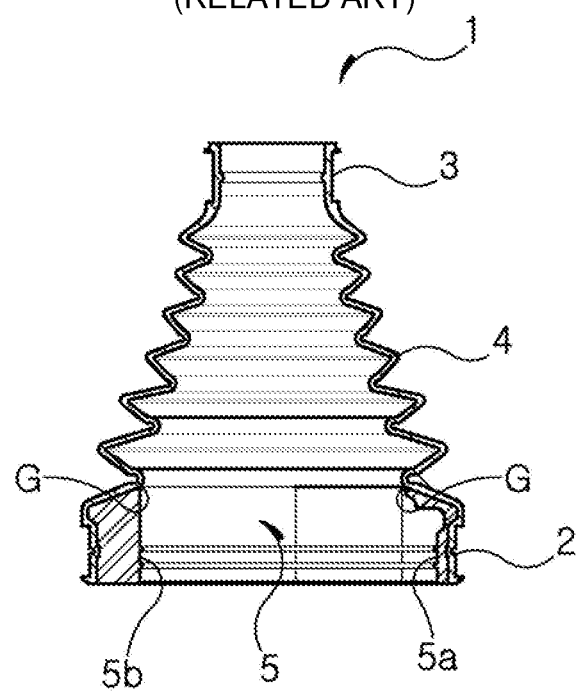
FIG. 4 is a sectional view of the constant-velocity joint boot.
Figure 5:
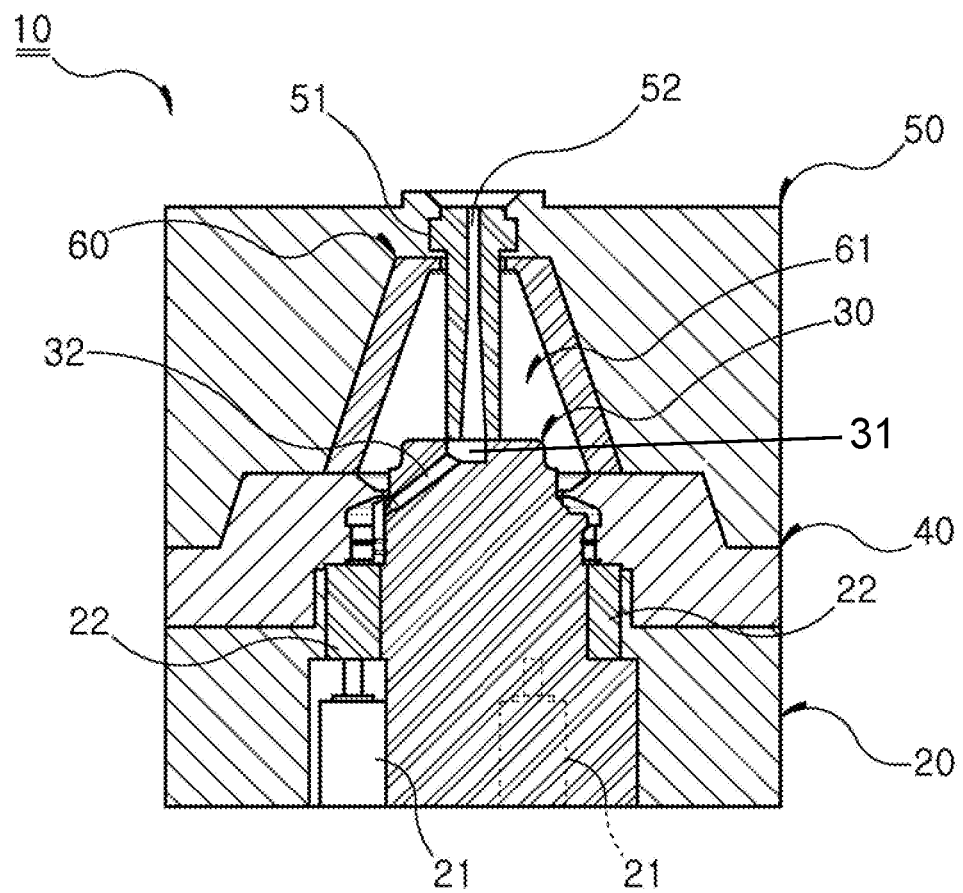
FIG. 5 is a sectional view showing an injection apparatus according to a preferred embodiment of the present invention.
Figure 6:
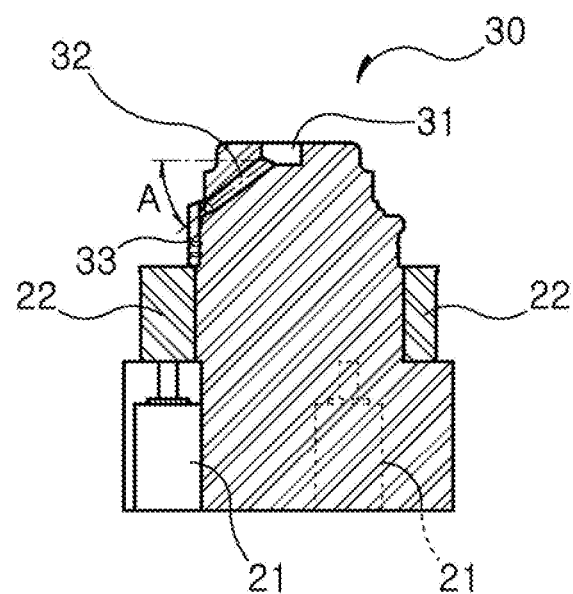
FIG. 6 is a sectional view showing a structure of a core mold according to the present invention.

FIG. 5 is a sectional view showing an injection apparatus according to a preferred embodiment of the present invention. As shown in FIG. 5, the injection apparatus 10 according to the preferred embodiment of the present invention includes: a base mold 20; a core mold 30 mounted at an approximately middle part of the base mold 20; a support mold 40 mounted above the base mold 20; an injection mold 50 mounted above the support mold 40; and a sealing cover 60 mounted at an approximately middle part of the injection mold 50. The structure of the injection apparatus 10 will be described in detail as follows.

The base mold includes: at least one elevation cylinder 21; and a purging block 22 mounted on a rod of the elevation cylinder 21 to be elevated by operation of the elevation cylinder 21. A molding part is formed at an upper part of the core mold 30 mounted at the middle part of the base mold 20 in such a way as to upwardly protrude through an inner area of the purging block 22.

The core mold 30 has a flat upper surface, and includes: a sprue 31 formed at the central point of the upper surface to supply a melt resin material; a plurality of runners 32 radially mounted around the sprue 31 to extend to the molding part; and injection gates 33 mounted at end portions of the runners 32 to form an injection structure for the melt resin material. The runners 32 is downwardly inclined in the direction of the injection gates 33, and the injection gates 33 are located at an upper area adjacent to a parting line interposed between the outer peripheral surface of the molding part of the core mold 30 and an inner peripheral surface of the large-diameter tube body 2 of the boot.

In this instance, the injection gates 33 shall not be located at an area which engages with the parting line or passes over the parting line. Preferably, the injection gates 33 are located at an upper area which are closest to the parting line within a range that the injection gates 33 do not engage with the parting line and do not have any influence on injection of the melt resin material.

The support mold 40 mounted above the base mold 20 includes: a pair of slide molds 41a and 41b which move forward and backward in a horizontal direction by a hydraulic cylinder or other driving means (not shown) so as to engage with each other or be separated from each other; and support grooves 42a and 42b respectively formed inside the slide molds 41a and 41b to grasp the outer peripheral surface of a lower end portion of a bellows connection tube 4 and the outer peripheral surface of a large-diameter tube body 2.

The injection mold 50 mounted above the support mold 40 ascends and descends vertically by the hydraulic cylinder or the driving means (not shown) to come into contact with the support mold 40 or to be separated from the support mold 40. The sealing cover 60 mounted in the middle of the injection mold 50 has a cover recess 61 upwardly dented so as to accommodate a small-diameter tube body 3 and the bellows connection tube 4 which are disposed at the upper end portion of the boot 1. The injection mold 50 includes an injection bushing 51 which vertically crosses the central portion of the cover hole 61 of the sealing cover 60 so as to supply a melt resin material through an injection hole 52 of the injection bushing 51.

When the injection mold 50 comes into contact with the support mold 40, a lower end of the injection bushing 51 of the injection mold 50 is connected to the sprue 31 of the core mold 30. A connector to which an injection cylinder 71 of an injection apparatus 70 is connected is disposed at an upper portion of the injection bushing 51 in order to supply the melt resin material upwardly through the injection cylinder 71, the injection bushing 51 and the sprue 31.

An injection method of the combined member 5 of the constant-velocity joint boot 1 using the injection apparatus 10 having the above-mentioned structure includes a step of putting in a first molded product and supporting the first molded product, a preparation step for second molding, a molding step of a second molding part, a step of cooling the second molding part and cancelling support of the first molded product, and a purging step of the boot which is finished in second molding. Processes of the steps will be described in detail as follows.

[Step of Putting and Supporting First Molded Product]

Figure 9:
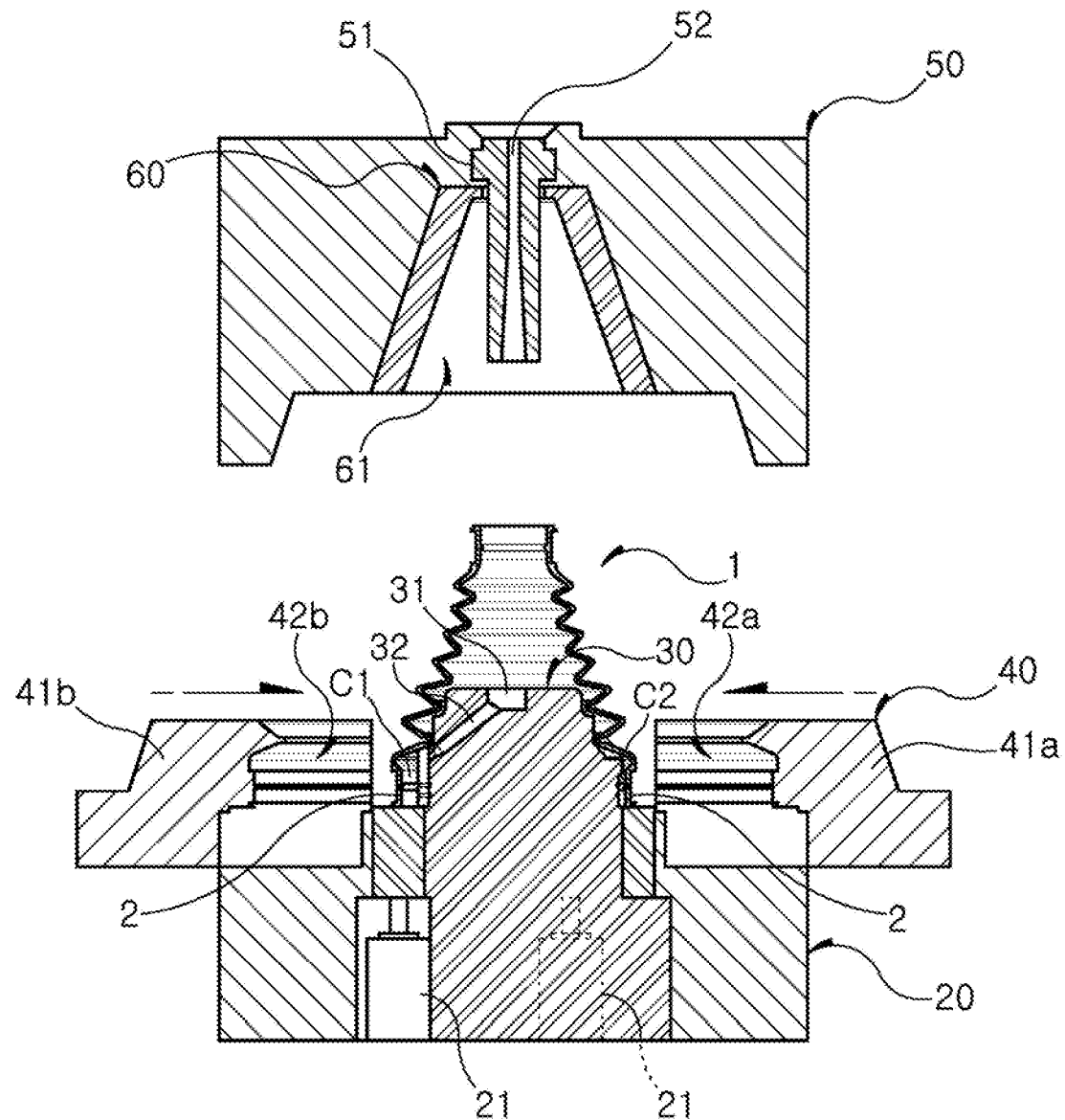
FIG. 9 is a sectional view showing a first step injection process of the combined member by the injection apparatus according to the present invention.

The large-diameter tube body 2 of the constant-velocity joint boot 1 which is the first molded product is seated on the purging block 22, which is mounted in the base mold 20, in such a way as to face down so that the large-diameter tube body 2 and the small-diameter tube body 3 are connected with each other through the bellows connection tube 4, and the boot 1 slides forward and backward to be located at an inner area of the support mold 40, which includes the support grooves 42a and 42b and the slide molds 41a and 41b (See FIG. 9), so that the outer peripheral surface of the lower end portion of the bellows connection tube 4 of the boot 1 and the outer peripheral surface of the large-diameter tube body 2 are grasped by the slide molds 41a and 41b when the slide molds 41a and 41b of the support mold 40 move forward.

[Preparation Step for Second Molding]

Figure 7:
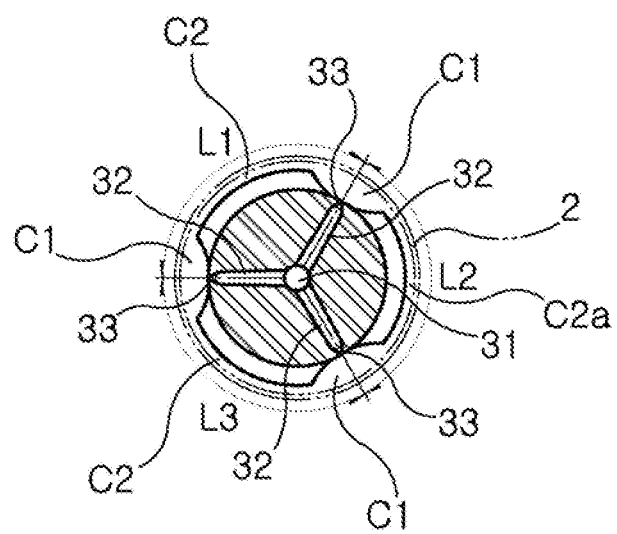
FIG. 7 is a sectional view showing an installed state of a runner and a gate mounted on the core mold.
Figure 8:
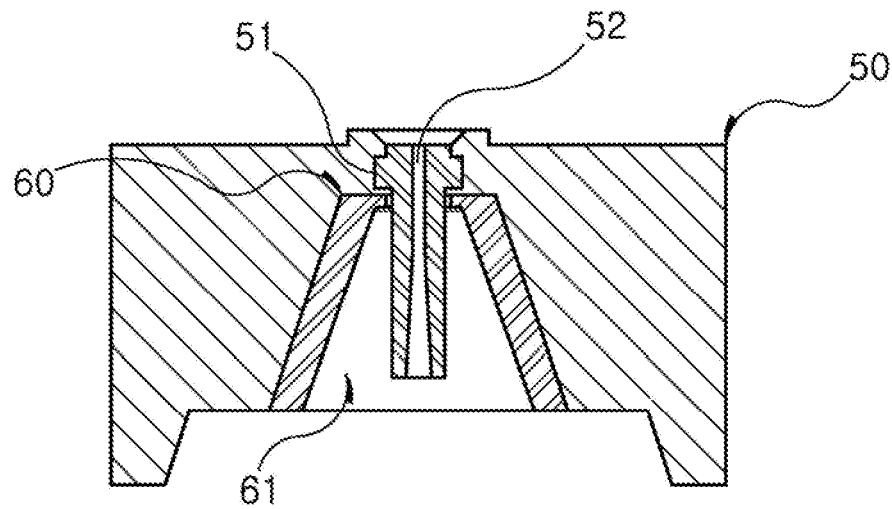
FIG. 8 is a sectional view showing an injection preparation process of a combined member by the injection apparatus according to the present invention.
Figure 8:
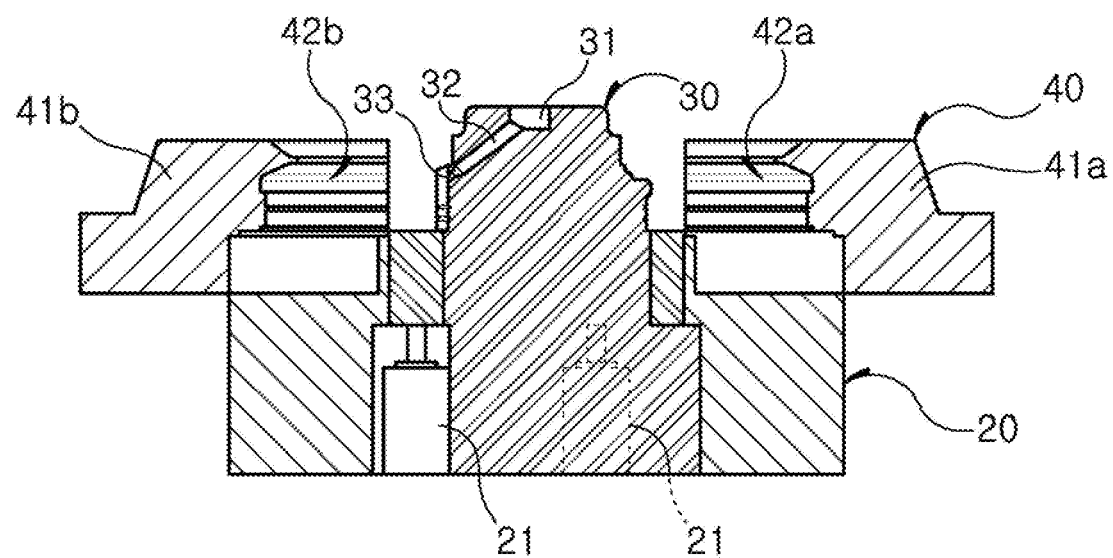
Figure 10:
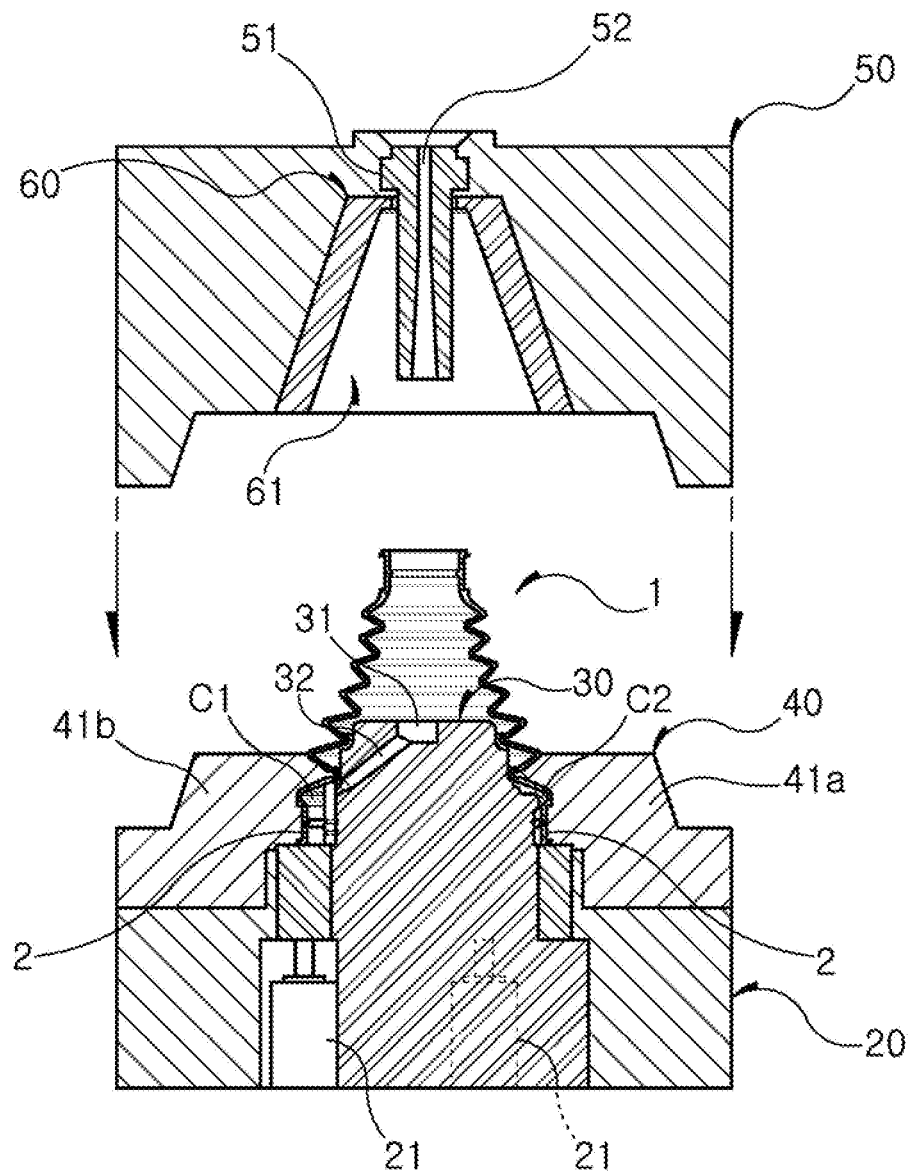
FIG. 10 is a sectional view showing a second step injection process of the combined member by the injection apparatus according to the present invention.
Figure 11:
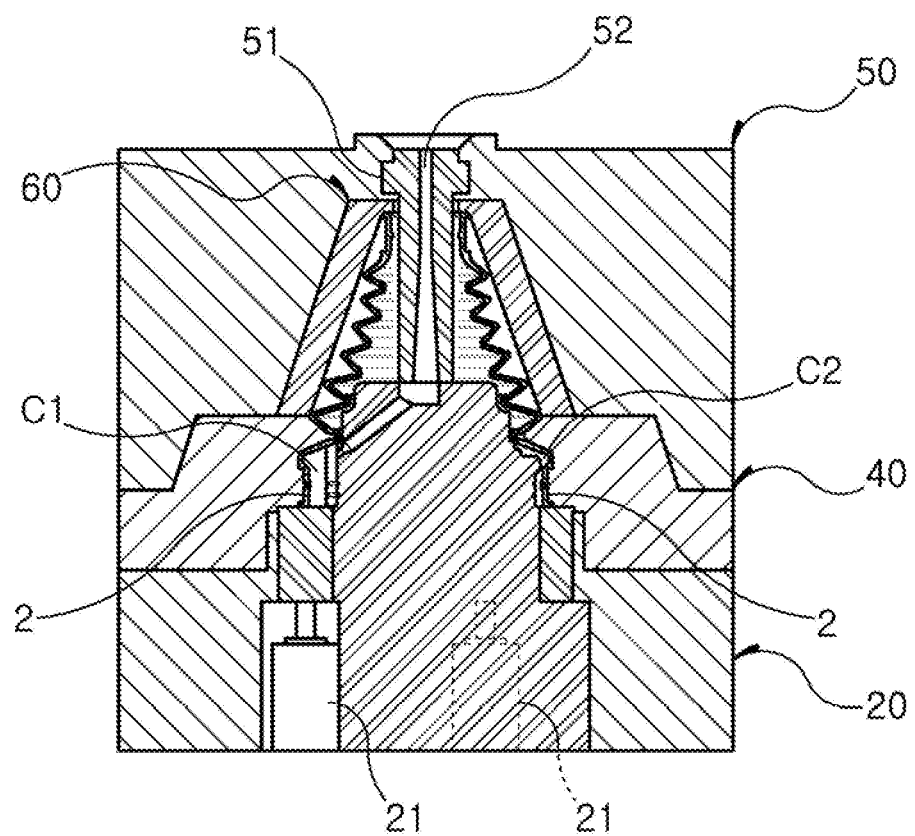
FIG. 11 is a sectional view showing a third step injection process of the combined member by the injection apparatus according to the present invention.

When the core mold 30 is arranged at the inner central portion of the large-diameter tube body 2 of the boot 1 supported by the support mold 40, a first molding space C1 for molding a hemispherical thick protrusion and a second molding space C2 for molding a thin protrusion are consecutively formed at an area between the inner surface of the large-diameter tube body 2 of the boot 1 and the core mold 30 in a circular form (See FIG. 7). The injection gates 33 connected with the sprue 31 of the core mold 30 via the runners 32 are located to be the closest to a parting line (G) formed between the inner surface of the large-diameter tube body 2 of the boot 1 and the top of the combined member 5, which will be molded later (See FIG. 10). The sealing cover 60 and the injection mold 50 having the injection bushing 51 are located to come into contact with the upper part of the support mold 40, so that the small-diameter tube body 3 of the boot 1 and the bellows connection tube 4 are sealed to the cover hole 61 of the sealing cover 60 and the upper end portion of the cover hole 61 presses the boot 1 downwardly such that the bottom surface of the large-diameter tube body 2 gets in close contact with the top surface of the purging block 22 and the lower end of the injection bushing 51 of the injection mold 50 gets in close contact with the top surface of the sprue 31 of the core mold 30 (See FIG. 11).

In this instance, the runners 32 of the core mold 30 radially extend toward the center of the sprue 31 and keep uniform intervals L1, L2 and L3 among the runners 32 to uniformly maintain an injection balance.

Moreover, the runners 32 are inclined downwardly toward the injection gates 33, and preferably, the inclination angle (A) is within a range of 25 degrees to 50 degrees. If the inclination angle (A) of the runners 32 is less than 25 degrees, excessive injection pressure is applied to the melt resin material because the melt resin material does not drop naturally, and it may cause generation of burrs because the melt resin material flows over the parting line (G) of the combined member 5 molded on the inner surface of the large-diameter tube body 2 due to the excessive pressure. If the inclination angle (A) of the runners 32 is above 50 degrees, because the melt resin material drops rapidly, an excessive amount of the melt resin material is injected even by a weak injection pressure, and it may cause generation of burrs because the melt resin material flows over the parting line (G) of the combined member 5 molded on the inner surface of the large-diameter tube body 2.

Furthermore, in the condition that the inclination angle (A) of the runners 32 is kept within the range of 25 degrees to 50 degrees, it is preferable that the diameter of the injection gates 33 be within a range of 0.7 mm to 2.0 mm and the melt resin material is injected into the first molding space C1 for molding the hemispherical thick protrusion.

[Second Molding Step]

Figure 12:
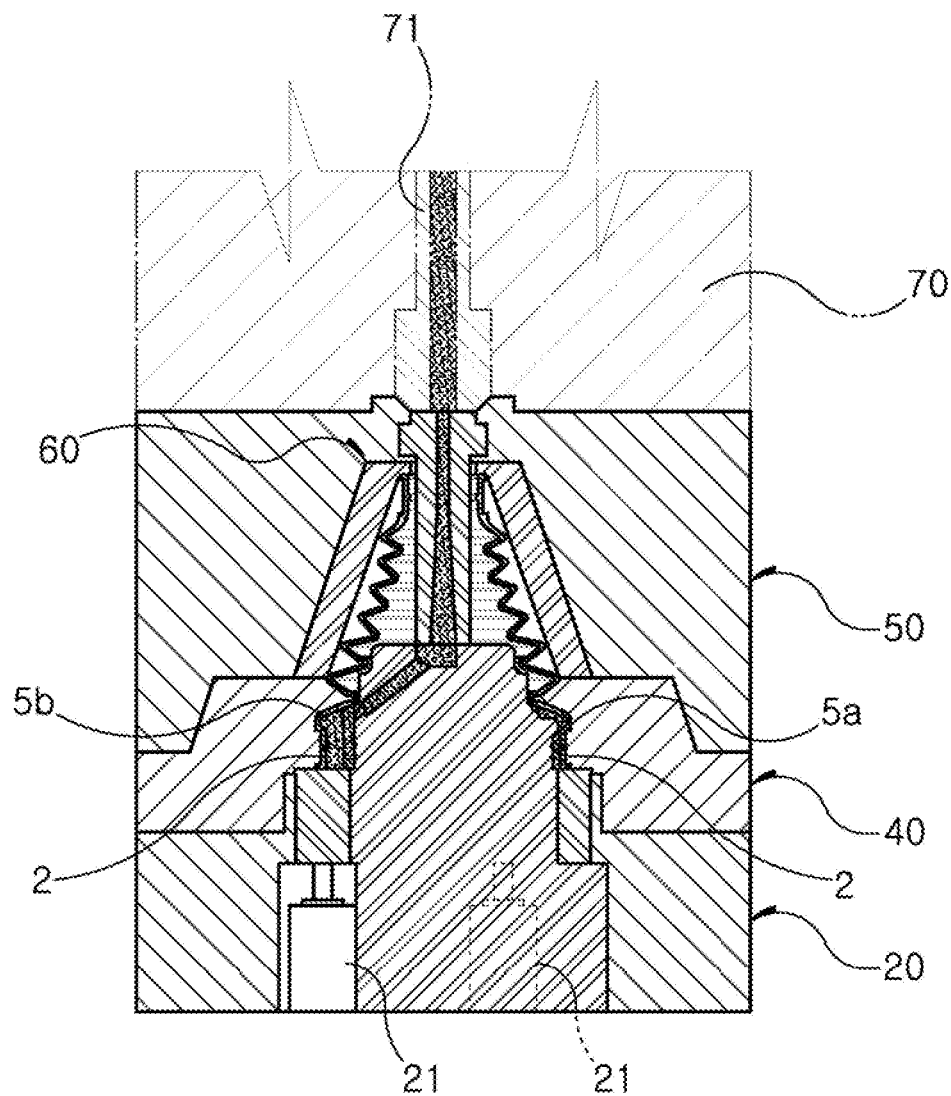
FIG. 12 is a sectional view showing a fourth step injection process of the combined member by the injection apparatus according to the present invention.

The injection apparatus 70 is located above the injection mold 50, and so, the melt resin material supplied through the injection cylinder 71 of the injection apparatus 70 is injected into the first molding space C1 disposed between the inner surface of the large-diameter tube body 2 of the boot 1 and the core mold 30 passing through the injection hole 52 of the injection bushing 51, the sprue 31, the runners 32 and the injection gates 33, so that the melt resin material is gradually charged from the bottom of the first molding space C1 and the second molding space C2 which communicate with each other (See FIG. 12).

In this instance, considering the inclination angle (A) of the runners 32, injection pressure relative to the melt resin material injected through the injection gates 32 keeps 20 to 40 Kgf to maintain injection speed of the melt resin material at 30 to 50 mm/sec, so that the injection apparatus can provide the maximum injection effect according to the setting conditions of the runners 32 and the injection gates 33.

[Step of Cooling and Cancelling Support]

Figure 13:
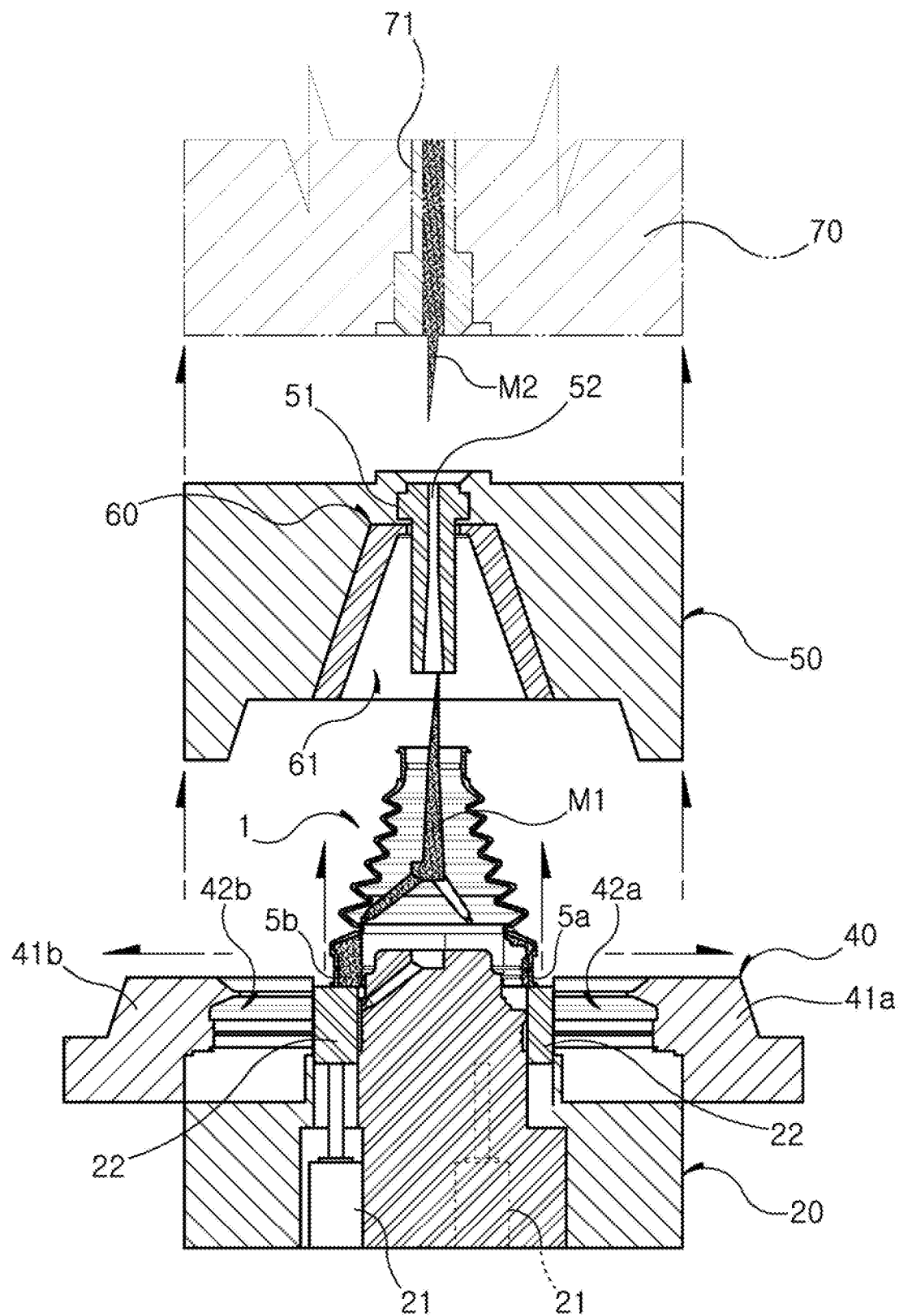
FIG. 13 is a sectional view showing an injection finishing process of the combined member by the injection apparatus according to the present invention.

Cooling means mounted inside the core mold 30 is operated to cool the combined member 5 injection-molded in the first and second molding spaces C1 and C2 between the inner surface of the large-diameter tube body 2 and the core mold 30, the injection apparatus 70 is separated, and then, the injection mold 50 is separated from the support mold 40 so as to release the sealed state of the small-diameter tube body 3 of the boot 1 and the bellows connection tube 4. After that, the slide blocks 41a and 41b move backward to release the support state of the slide bocks 41a and 41b relative to the lower end portion of the bellow connection tube 4 and the outer peripheral surface of the large-diameter tube body 2 (See FIG. 13).

In the meantime, during the process of lifting and separating the injection mold 40, a boundary portion between the molded combined member 5 and the injection gates 33 is cut and separated from the combined member 5 of the boot 1 while a lower end remaining resin material M1 filling the injection hole 52 of the injection bushing 51, the sprue 31 and the runners 32 is pulled upwardly. During the process of lifting and separating the injection apparatus 70, an upper end remaining resin material M2 which remains in the injection cylinder 71 and the lower end remaining resin material M1 are separated (See FIG. 13). The lower end remaining resin material M1 which remains inside the boot 1 is removed after the boot 1 is purged, and the upper end remaining resin material M2 which remains in the injection cylinder 71 is removed using a separate removing means, and then, the next molding is prepared.

[Purging Step]

The boot 1 on which the combined member 5 is injected doubly by the purging block 22 elevated by operation of the elevation cylinder 21 mounted on the base mold 20 is vertically purged from the core mold 30 (See FIG. 13), and then, is discharged out using a discharge loader or manually.

As described above, through the above steps, the combined member 5, which includes the thick protrusion 5b and the thin protrusion 5a accommodating the outer diameter of the housing of the constant-velocity joint, is injected-molded inside the large-diameter tube body 2 of the first molded constant-velocity joint boot 1. According to the present invention, the melt resin material is injected in such a way as to naturally drop through the injection gates 33 of the runners 32 which are located to be closest to the parting line between the large-diameter tube body 2 of the first molded boot 1 and the combined member 5 so as to gradually fill the first and second molding spaces C1 and C2 from the bottom to mold the combined member 5. Therefore, the present invention can prevent that the melt resin material flows over the parting line (G) between the inner surface of the large-diameter tube body 2 and the combined member 5 by excessive injection pressure.

Because the purging device of the simple structure is mounted at the lower portion of the first molded boot 1 through the double injection method that supplies the melt resin material from the upper part, the present invention can rapidly purge the boot 1, which finishes double injection to the combined member 5, without any damage.

What is claimed is:

1. An injection apparatus of a combined member of a constant-velocity joint boot, comprising:
    a base mold comprising at least one elevation cylinder and a purging block mounted on a rod of the elevation cylinder to be elevated by an operation of the elevation cylinder;
    a core mold comprising a flat upper surface and a molding part upwardly protruding through an inner area of the purging block of the base mold, a sprue mounted at a central point of the flat upper surface to allow a melt resin material to be supplied, a plurality of runners radially mounted around the sprue to extend to the molding part, and injection gates mounted at end portions of the plurality of runners to form an injection structure for the melt resin material, wherein the plurality of runners are downwardly inclined in a direction of the injection gates and the injection gates are located at an upper area of the molding part of the core mold adjacent to a parting line interposed between an outer peripheral surface of the molding part of the core mold and an inner peripheral surface of a first tube body of the constant-velocity joint boot;
    a support mold comprising a pair of slide molds moveable forward and backward in a horizontal direction by a hydraulic cylinder to engage with each other or be separated from each other, and support grooves respectively formed inside the slide molds to grasp an outer peripheral surface of a lower end portion of a bellows connection tube of the constant-velocity joint boot and the outer peripheral surface of the first tube body of the constant-velocity joint boot;
    an injection mold mounted above the support mold, vertically ascendable and descendible by the hydraulic cylinder to come into contact with the support mold or to be separated from the support mold;
    a sealing cover mounted at the central portion of the injection mold and comprises a cover hole upwardly dented to accommodate a second tube body and the bellows connection tube which are disposed at an upper part of the constant-velocity joint boot, the first tube body having a larger diameter than the second tube body; and
    wherein the injection mold comprises an injection bushing which vertically crosses a central portion of the cover hole of the sealing cover to supply the melt resin material to the sprue through an injection hole of the injection bushing.

2. A method for injecting the combined member of the constant-velocity joint boot using the injection apparatus of claim 1, comprising steps of:
    seating the first tube body of the constant-velocity joint boot on the purging block, which is mounted in the base mold, to face down so that the first tube body and the second tube body of the constant-velocity joint boot are connected with each other through the bellows connection tube;
    moving slide molds of the support mold forward so that the outer peripheral surface of the lower end portion of the bellows connection tube and the outer peripheral surface of the first tube body are grasped by the slide molds;
    arranging the core mold at the inner central portion of the first tube body supported by the support mold;
    consecutively forming a first molding space to mold a hemispherical thick protrusion and a second molding space to mold a thin protrusion at an area between an inner surface of the first tube body and the core mold in a circular form;
    positioning injection gates connected with the sprue of the core mold via the plurality of runners to be closest to a parting line formed between the inner surface of the first tube body and a top of a combined member;
    sealing the second tube body and the bellows connection tube and pressing the constant-velocity joint boot downwardly with a sealing cover disposed at the injection mold so that a bottom surface of the first tube body comes into a contact with an upper surface of a purging block and a bottom of the injection bushing of the injection mold comes into a contact with an upper surface of the sprue of the core mold;
    positioning the injection apparatus above the injection mold so as to inject the melt resin material supplied through an injection cylinder of the injection apparatus into the first molding space, disposed between the inner surface of the first tube body and the core mold, and through an injection hole of the injection bushing, the sprue, the plurality of runners and the injection gates so that the melt resin material is gradually charged from a bottom of the first molding space and the second molding space, the first and second molding spaces communicating with each other;
    cooling the combined member injection-molded in the first and second molding spaces between the inner surface of the first tube body and the core mold with a cooler mounted inside the core mold;
    separating the injection apparatus and the injection mold from the support mold to release a sealed state of the second tube body and the bellows connection tube;
    moving the slide blocks backward to release a support state of the slide blocks relative to the lower end portion of the bellow connection tube and the outer peripheral surface of the first tube body; and
    vertically purging the constant-velocity joint boot, which finishes double injection relative to the combined member, from the core mold by the purging block ascending by an operation of an elevation cylinder mounted on the base mold; and
    discharging the constant-velocity joint boot using a discharge loader.

3. The injection method according to claim 2, further comprising steps of mounting the injection gates at end portions of the plurality of runners of the core mold such that the plurality of runners radially extend toward a center of the sprue and keep uniform intervals among the plurality of runners; connecting the injection gates of the plurality of runners to the first molding space; and downwardly inclining the plurality of runners toward the injection gates to keep an inclination angle within a range of 25 degrees to 50 degrees, and wherein the injection gates respectively mounted at the end portions of the plurality of runners are 0.7 mm to 2.0 mm in diameter.

4. The injection method according to claim 2, wherein an injection pressure of the melt resin material injected through the plurality of runners and the injection gates are within a range of 20 Kgf to 40 Kgf; and wherein an injection speed of the melt resin material is within a range of 30 mm/sec to 50 mm/sec.

\* \* \* \* \*